United States Patent [19]

Nishinozono

[11] Patent Number: 5,689,765
[45] Date of Patent: Nov. 18, 1997

[54] IMAGE FORMING APPARATUS WHICH INPUTS INFORMATION FROM A USER DURING AN IMAGE FORMING OPERATION

[75] Inventor: Michiaki Nishinozono, Tokyo, Japan

[73] Assignee: Ricoh Company, Ltd., Tokyo, Japan

[21] Appl. No.: 540,240

[22] Filed: Oct. 5, 1995

[30]  Foreign Application Priority Data

Oct. 5, 1994 [JP] Japan .................. 6-266212

[51] Int. Cl.$^6$ .................................. G03G 15/00
[52] U.S. Cl. .............................. 399/81; 399/85
[58] Field of Search .................... 355/208, 209, 355/313, 314; 399/81, 82, 85

[56]  References Cited

U.S. PATENT DOCUMENTS 5,045,880  9/1991  Evanitsky et al. ............. 355/209 X
5,185,634  2/1993  Muramatsu ................... 355/314
5,384,632  1/1995  Nakajima et al. .............. 355/313

Primary Examiner—William J. Royer
Attorney, Agent, or Firm—Oblon, Spivak, McClelland, Maier & Neustadt, P.C.

[57]  ABSTRACT

An image forming apparatus which allows information to be input regarding the current copying job or a new copying job while a current copying job is being executed. Information which can be input relating to the present job includes the change of operating parameters and the setting of a conditional stop condition which will stop the current copying operation upon its occurrence. Information can also be input which relates to the end of the current job being performed. For example, as the job is being performed, the operator can request that a sound be generated when the current job ends. Additionally, parameters relating to the next job to be performed can be altered or added.

12 Claims, 5 Drawing Sheets

IMAGE FORMING APPARATUS WHICH INPUTS INFORMATION FROM A USER DURING AN IMAGE FORMING OPERATION

BACKGROUND OF THE INVENTION

1. Field of the Invention

The present invention relates to an image forming apparatus capable of changing the parameters of or stopping an executing job instantaneously, at a future time or after an event executes in the image forming apparatus such as a copying machine, printer, facsimile device, or other business office machine.

2. Description of the Related Art

Regarding an image forming apparatus utilizing an electrophotographic process such as a copying machine, printer, facsimile device, etc., such image forming apparatuses comprise a construction capable of forming an image on a recording medium using image forming parts such as a photosensitive body utilizing image information such as from a document. The image information is obtained by scanning a document set on a contact glass or by the document passing a slit glass by use of a reading-out optical system and capable of sending the image information to the exterior through the communication circuit. In recent image forming apparatuses, there exists a multi-function type apparatus having not only the copying function but facsimile function, etc. To take the copying function as an example, various existing functions can be performed. Those subsidiary functions are altering of enlargement/reduction amount, editing, composing of an image, double sided copying, etc.

As a processing system for processing plural jobs by one apparatus, a mutual conversation type system of operation is well-known. According to such operation system, an operator inputs an instruction as to processing of one job in the apparatus. After the apparatus finishes the processing, it performs an inputting of the next job processing. In such mutual conversation type apparatus operating system, the instruction to be inputted to the apparatus relates to the operational contents of processing the job. What job processing is done after finishing the relevant job processing is not considered at all. For this reason, it follows that the instruction of inputting is done for the next job only after the first job is finished.

In such mutual conversation type apparatus operating system, the operator cannot undertake a new job processing during the time period when the apparatus is processing the preceding job, even though there exists a new job to be input. It is possible to input the new job only after the preceding job processing is finished. For this reason, the apparatus cannot be used until the job is finished executing. This causes the operator to stand in front of the copying machine for a while without anything to do. Further, when the contents of the job processing being executed must be changed, it is necessary to temporarily stop the operation of the apparatus and issue instructions thereafter.

Furthermore, there is well known a batch processing in which one job and other jobs subsequent thereto are previously set and the processing thereof is executed in a predetermined order. Assuming that the above batch processing is utilized, not only the instructions for the job being processed but the instructions for the job to be processed thereafter can be set and inputted, and the instructions are executed successively. However, in the above batch processing, other jobs excluding the previously set plural jobs cannot be added after starting the apparatus and the same cannot be changed.

Furthermore, there exists a cueing method of successively executing the job processing by requesting other jobs subsequent to a job during the time period when the job is requested. The above cueing method is characterized in that input information can be precedingly inputted. According to the cueing method, even though the apparatus is executing the preceding job, the other job can be requested. However, since the new job request has wait in the order of the job queue, it follows that the new job can be processed only after all of the preceding job processings are completed. Consequently, it is difficult to change the contents of the job being executed or to process the item of the requested matter with suitable timing.

In the image forming apparatus, such as a copying machine or the like commonly used by more than one person, it has been necessary that an operator copy successively plural documents. Thereafter, the same or another operator has to wait the completion of the copying operation and thereafter has to perform the job processing.

SUMMARY OF THE INVENTION

The present invention was made in consideration of the above-mentioned matters and it is an object of the present invention to solve the above-described problems.

It is another object of the present invention to provide an image forming apparatus capable of adding a new job processing to a preceding job processings when executing the latter in the case of practicing plural job processings in one image forming apparatus.

It is still another object of the present invention to provide an image forming apparatus capable of changing the content of the job being processed or the content of a job to be performed in the case of practicing plural job processings in one image forming apparatus.

It is still another object of the present invention to provide an image forming apparatus capable of adding a new job processing to preceding job processings when executing the latter in the case of practicing plural job processings in one image forming apparatus and is also capable of changing the content of the job being processed or the content of a job to be performed in the case of practicing plural job processings in one image forming apparatus.

In order to obtain the above-mentioned objects, an image forming apparatus is provided including a document scanner, an image forming part for forming the image on recording paper in accordance with the image information obtained by the scanner, an automatic document feeder for feeding the document sheet by sheet to the document reading-out position, control means for controlling those construction elements, and in input operating part provided with input means for designating the operational contents of the above-mentioned respective construction elements. The present invention is characterized in that the above-mentioned control means performs a control operation so as to enable a change in a series of the job processing operations to the other operational content relevant to the above job processing operation by the operation from the above input operating part during the time period of the operation after the above-mentioned elements start a series of job processing operations.

The present invention is further characterized in that the apparatus is constructed such that during the time period of the operation after the above-mentioned elements start a series of job processing operations, the stoppage or alteration of a series of operations can be indicated not immediately but at an optional stage thereafter by the operation from the above-mentioned input operating part.

The present invention is still further characterized in that the above-mentioned input operating part is provided with a lock switch capable of indicating whether or not the input operation can be performed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
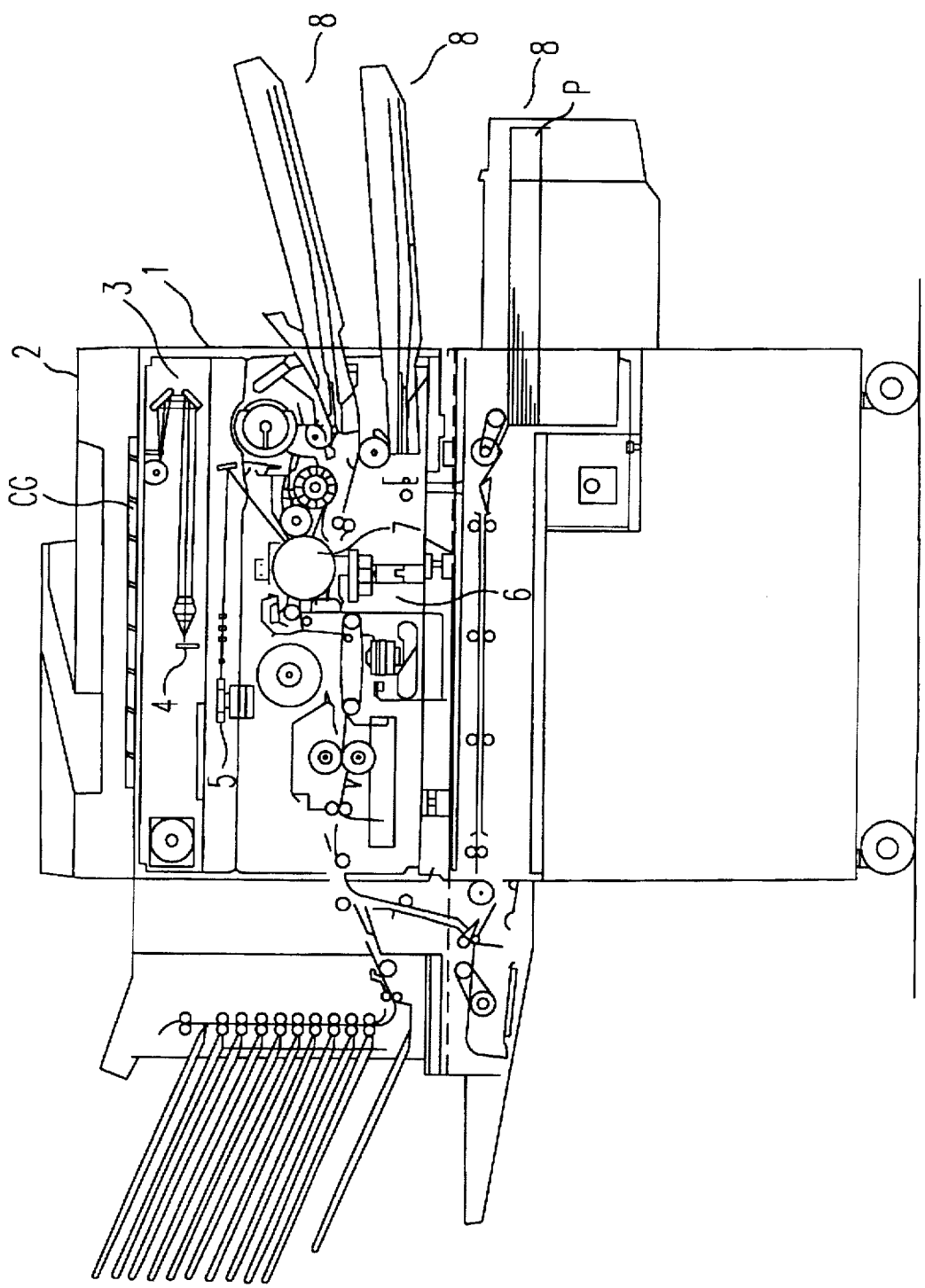
FIG. 1 is a cross-sectional view showing the internal structure of a digital copying machine which serves as the electrophotographic image forming apparatus according to the present invention.

Referring now to the drawings, wherein like reference numerals designate identical or corresponding parts throughout the several views, and more particularly to FIG. 1 thereof, there is illustrated a cross-sectional view showing an overall internal structure of a digital copying machine which is an electrophotographic image forming apparatus according to the present invention. An automatic document feeder 2 is disposed on an image forming apparatus main body 1. By use of the automatic document feeder 2, documents are fed sheet by sheet onto a contact glass CG which has a document scanning position. An optical scanning system 3 is located at a position just below the contact glass CG and scans or reads a document on the contact glass. The scanned image is focused on an image detector 4 such as a charge coupled device (CCD). After scanning the document to obtain image information, a laser beam from a writing apparatus 5 which includes a polygonal mirror driven by a motor is directed onto a photosensitive drum 7, which is part of an image forming part 6. A toner image is transferred and fixed on recording paper P fed from a paper feeding part 8. Since the image forming process of the electrophotographic system is well known, the detailed explanation thereof is omitted.

The present invention is also applicable to an electrophotographic image forming apparatus in which a document moves on glass containing a slit and a fixed optical system performs the scanning operation.

Figure 2:
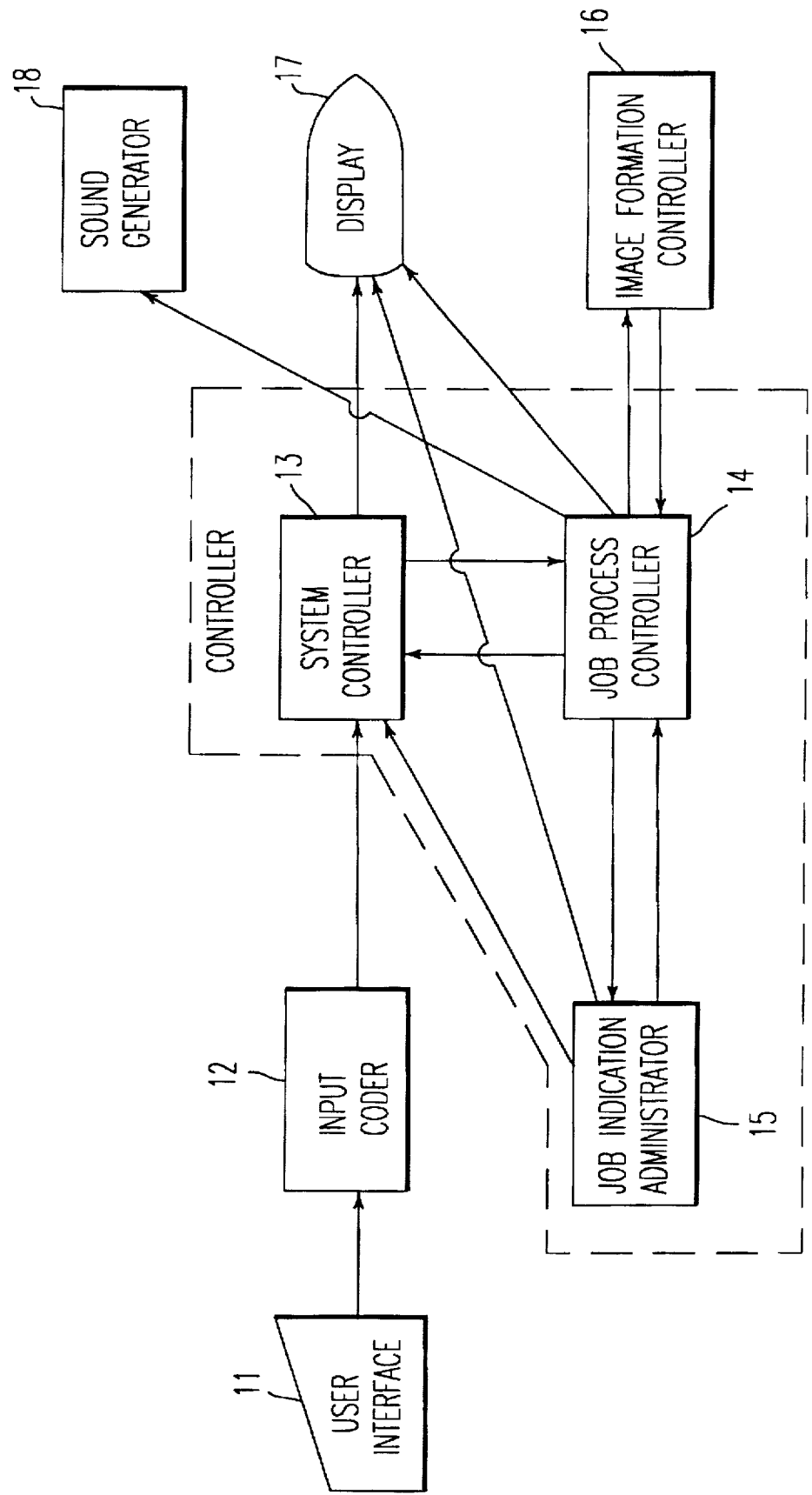
FIG. 2 is a block diagram showing an example of a control system of the image forming apparatus according to the present invention.

FIG. 2 is a block diagram showing an example of a control system in the image forming apparatus according to the present invention. The control system includes a user interface 11 with which a user interacts and controls the operation and parameters of the image forming apparatus. The user interface is the control panel of the apparatus. An input coder 12 codes the input information from the user interface 11 and outputs the coded input information. There is a system controller 13 for controlling and changing the general operation of the image forming apparatus, and controlling the starting and ending of one-job processing. The system controller 13 outputs information regarding indications of executing the suspending operations and indicates the operating parameters (contents). There is a job process controller 14 for processing and controlling the processing operation of a series of jobs. The job process controller 14 outputs various state and operation indication information. A job indication administrator 15 starts an appropriate action in order to respond to the inputted information and indicates items and commands during the time period of processing jobs. The administrator 15 outputs an indication of jobs to the system controller 15 and an indication of operations to the job process controller 14. An image formation controller 16 controls the actions required for the image formation (conveying of the document, scanning of the image, image formation, etc.) based on signals from the job process controller 14. A display 17 displays information regarding the operation being performed including operations regarding the system controller 13, the job process controller, and the job indication administrator 15. A sound generator 18 such as a speaker generates various types of effective sound including notification (information) sounds, alarming sounds, etc. The display 17 and/or sound generator 18 may be integrated to the user interface 11. The system controller 13, the job process controller 14, and the job indication administrator part 15 make up the controller of the image forming apparatus.

Figure 3:
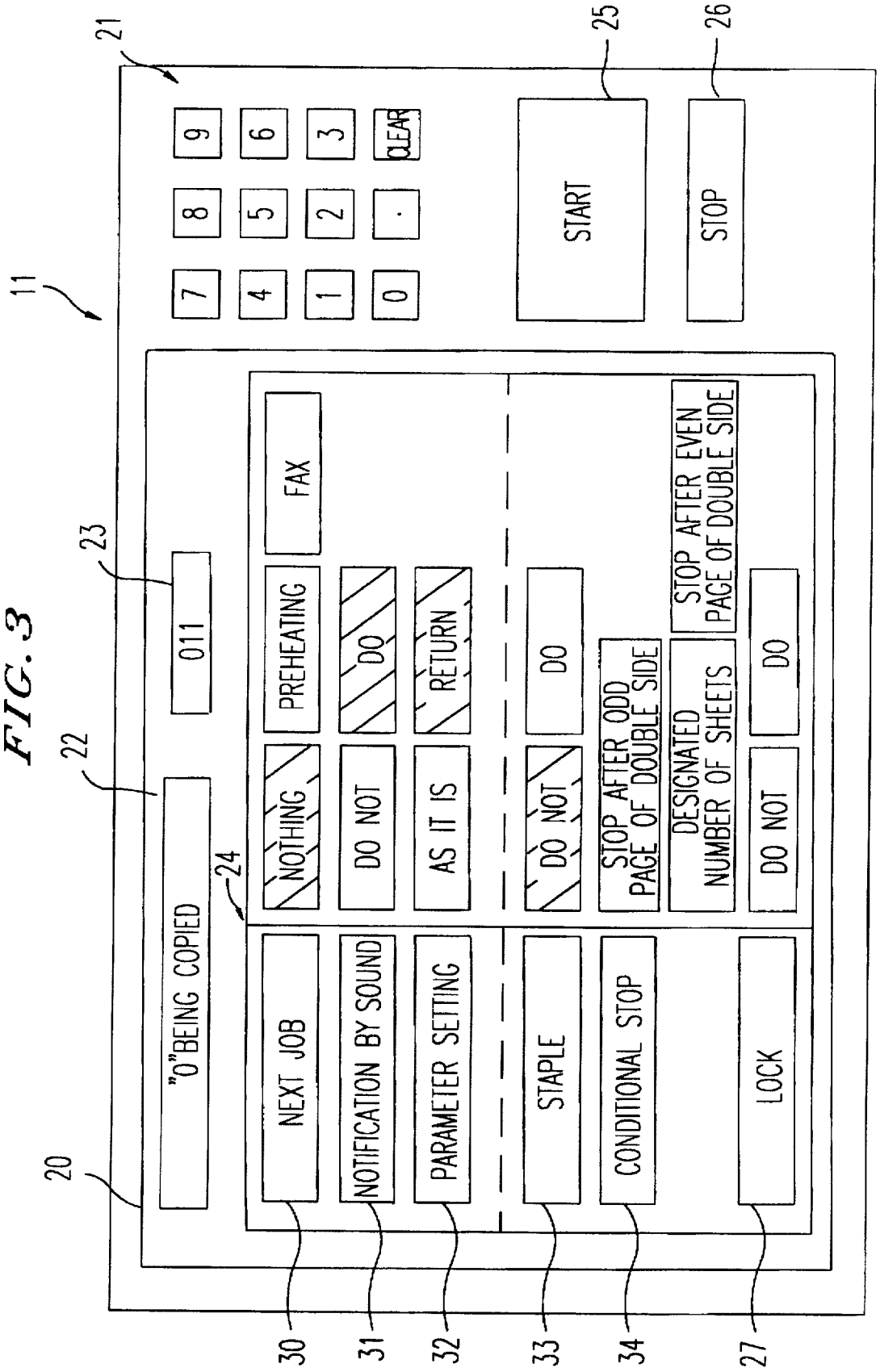
FIG. 3 is a diagram of a user interface of the image forming apparatus.

FIG. 3 shows the construction of the user interface 11. An LCD touch panel 20 and a ten-key pad 21 are disposed on the user interface 11. The LCD touch panel 20 is provided with, for instance, a job guidance display 22, a copied sheets number display 23, and various buttons and displays on a section 24.

The input coder 12 illustrated in FIG. 2 outputs the input information to the job indication administrator 15 when the user interface 11 is used. The job indication administrator 15 performs a control operation such that the desired proceedings such as the alteration or stopping of the operational contents and the operating indication for the subsequent jobs are added to the job processings being executed in accordance with the input information.

The parts shown by the reference numerals 27 and 30–33 solely display. The section 24 is provided with respective input indicators such as a "lock" indicator 27, a "next job" indicator 30, a "notification by sound" indicator 31, a "parameter setting" indicator 32 used to set parameters or job contents, a "staple" indicator 33, and a "conditional stop" indicator 34.

The respective buttons representing the indication contents or parameters are arranged to the right side of the respective indicators. The "next job" indicator 30 utilizes a "nothing" button for inputting whether there exists a job to be performed after the job processings being executed at present are terminated, a "pre-heating" button for putting the apparatus in a state of energy saving in order to "stand-by" for the next job, and a "FAX" switch for setting the apparatus to the FAX mode.

The "notification by sound" button 31 includes a "do not" button and a "do" button for selecting whether the transferring to a predetermined state after the termination of the job should be notified to the operator. In case that the "do" button is selected, a "BEEP" or other sound is outputted when the state is transferred to the predetermined state such as the end of job state. The "parameter setting" indicator 32 comprises an "as it is" button and a "return" button. When the "return" button is pressed, the job process controller 14 sets the image formation controller 16 to the initial state.

The "staple" indicator 33 uses "do not" and "do" buttons for commanding the stapling operation on a bundle of recording paper stacked on a tray or a sorter bin.

The "conditional stop" indicator 34 can stop a double-sided copying operation either after an odd page or an even page is copied. There is also a "designated number of sheets" button used on conjunction with the ten key pad 21 for stopping the copying operation at a specific page. For instance, in the case of stopping the copying operation at the tenth sheet of the document, the stoppage sheets number is input-designated by the "designated sheets number" switch and the ten key pad.

The buttons associated with the lock indicator 27 are used to set and reset a lock flag which prohibits or prevents the use of other keys (besides the lock keys) of the user interface.

The featured construction of the present invention is as follows:

(1) The operational parameters (contents) relating to the job processing operation are inputted during the time period of executing a series of job processings.

(2) The stoppage of the operation or the alteration of the parameters can be done either instantly or at an optional stage thereafter during the time period after a series of job processing operations are performed.

(3) Erroneous user input can be prevented by locking the keyboard through the use of the lock buttons.

The parameters associated with the job processing operation mentioned in the above item (1) represent, for instance, the addition of the staple processing, the alteration of the employed recording paper by changing the paper feeding tray (e.g., the alteration from blank paper to previously copied paper having an image on one side), the alteration between the automatic paper selecting mode and the fixed paper size-changeable copying mode, etc.

Furthermore, the subsequent optional stage mentioned in the above item (2) represents, for instance, the case of stopping the copying operation or changing the mode of the magnification/reduction rate, etc., at the time of even-number page for double-sided copying, or the case of stopping the copying operation or changing the magnification/reduction amount, etc., when the number of copied paper sheets reaches a predetermined number, or the case of performing the operation stoppage or the mode alteration when a document of different size is encountered, or the case of performing the operation stoppage or the mode alteration at the stage of sorter/stack division.

Hereinafter, the function and operation of the elements shown in FIG. 2 are explained.

The copying mode and the other copying conditions (operational parameters or contents) are set by performing the input operation from the LCD (Liquid-Crystal Display) touch panel 20 and the ten-key pad 21, prior to the start of the copying operation by pressing the start button 25.

As a result of pressing the start key 25 after the input operation, the inputted information is outputted from the user interface 11 to the system controller 13 through the input coder 12. In the system controller 13, the operational contents indication and the practice indication are performed for the display 17. And further, the system controller 13 outputs a control signal which includes display information for displaying guidance showing the job contents to the job guidance display 22 or the display 17.

The job process controller 14 outputs operation indicating information to the image information controller 16 in accordance with the operational contents indicating information and the practice indicating information from the above-mentioned system controller 13. This operation indicating information is control information required for causing the image forming part to perform the image forming operation in accordance with the indication information from the user interface 11. The job process controller 14 receives the information in connection with the process or result during the time period of performing the image forming operation from the image formation controller 16, and the same outputs the received information to the display 17 as the display information. Further, the count number of the copied sheets is displayed on the copied sheets number display 23 of the LCD at the same time as practicing the copying operation.

As mentioned above, the job indication administrator 15 is a block corresponding to another job inputted during the job processing. The contents of the job indicating contents display 24 are displayed on the LCD touch panel 20 as shown in FIG. 3 when the job process controller 14 receives a start command.

The indication regarding the other requirements in connection with the present job from the operator during the present job processing or the requirement in connection with the jobs subsequent thereto is processed in the job indication administrator 15. The job being practiced is terminated, when a series of image forming operations performed in accordance with the input information are finished, or when the stop key 26 is pressed. When the stop key is pressed, the system controller 13 outputs a stoppage indication to the job process controller 14. The job indication administrator 15 releases the job indication contents display 24 on the LCD touch panel when the job process controlling part 14 confirms the completion of the job process.

On the basis of the control system having the construction shown in FIG. 2 and the user interface having the construction shown in FIG. 3, the detailed operation of the apparatus according to the present invention is described hereinafter.

Figure 4:
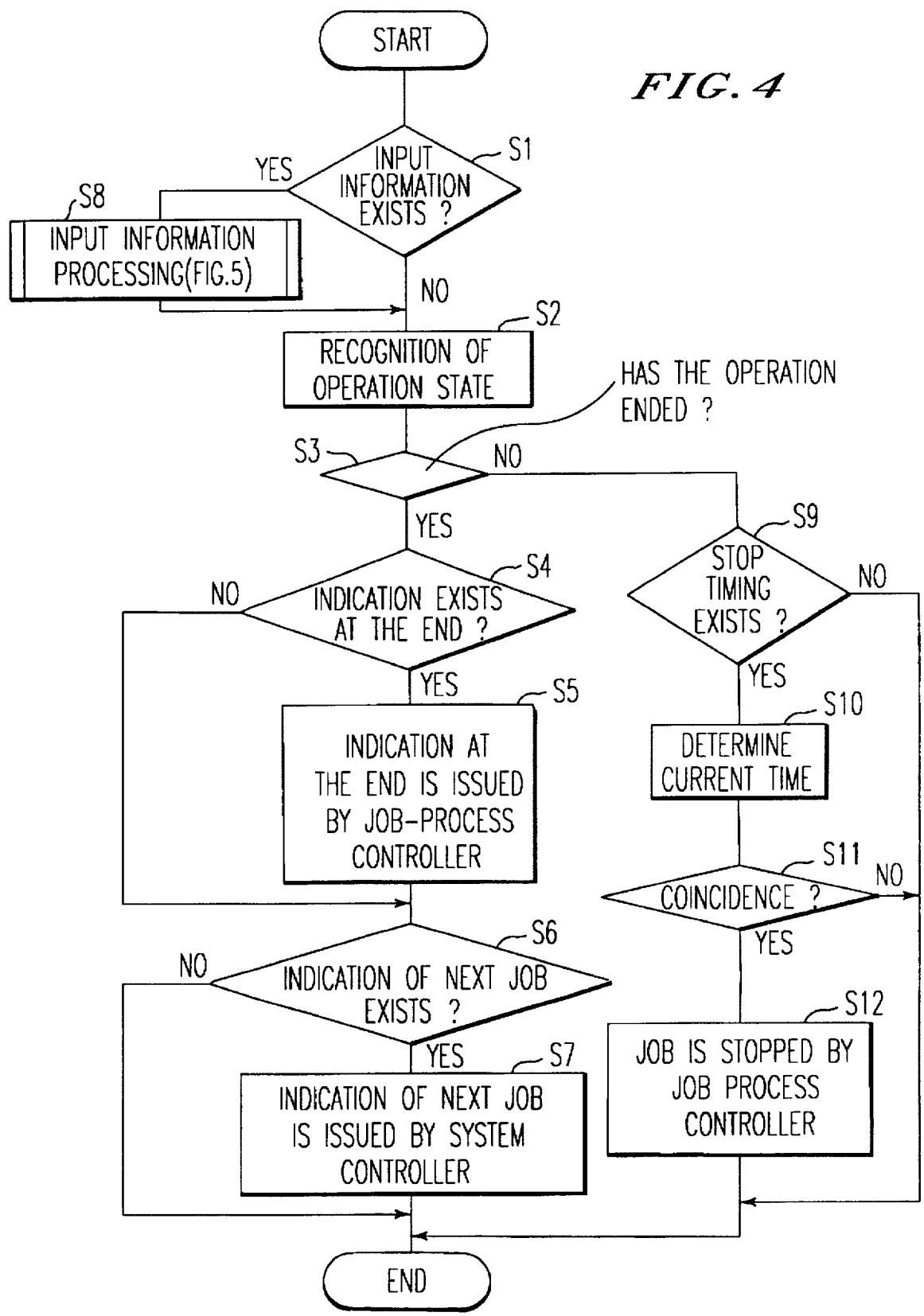
FIG. 4 is a flowchart showing a general operation of the image forming apparatus according to the present invention.

FIG. 4 is a flowchart showing the operation of the job indication administrator 15. The job indication administrator 15 always operates when practicing the job processing operation, and performs the processing as the occasion demands. Step S1 determines if input information exists. The input information may request the alteration of the operational parameters or be a stoppage request in relation to the job processing being performed and/or an indication of the operation for subsequent jobs which are inputted through the user interface 11. When the input information is determined to exist in step S4, the input information processing is performed in the job indication administrator 15 by step S8.

Figure 5:
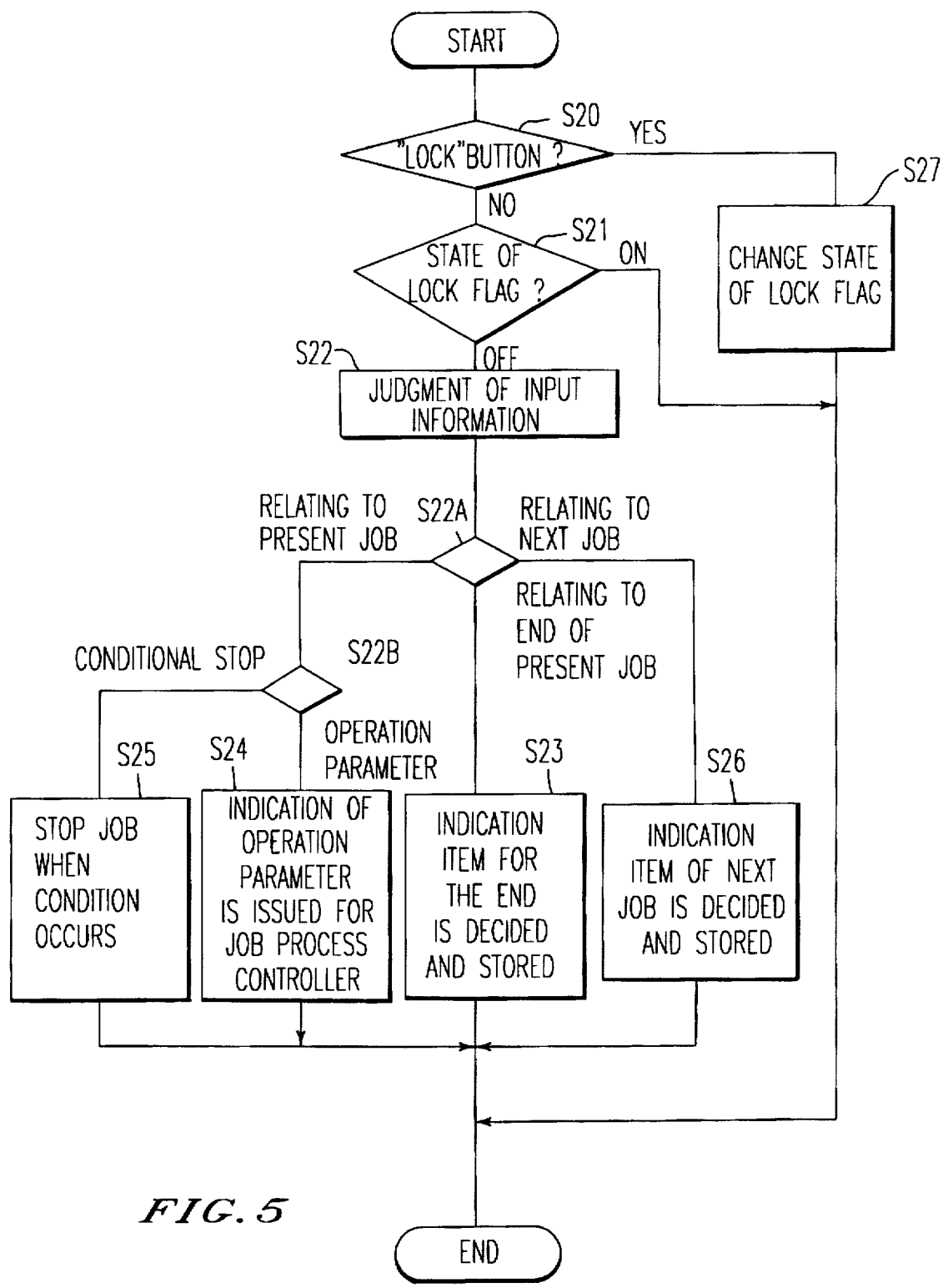
FIG. 5 is a flowchart showing the inputting of commands and the relevant job processing performed thereafter.

FIG. 5 is a flowchart showing the details of input information processing performed by the job indication administering part 15 in step S8 of FIG. 4. At first, whether the lock button has been operated or not is judged in step S20. When the "lock" button is turned on, all of the input buttons excluding the lock button are not used. On the other hand, when the "do not lock" button is turned on, the operation of the other input buttons is allowed. When step S20 determines that the lock button has been pressed, step S27 changes the state of the lock flag, if appropriate, and the process ends. When step S20 determines that the lock button has not been pressed, step S21 examines the state of the lock flag. If the lock flag is on, the process ends because input from the user interface is prohibited. If the lock flag is off, step S22 judges the input information. Depending on which input switch is pressed, the operation is divided into several processings.

Step S22A determines if the input is relevant to the present job, relevant to the terminating of the present job, or relevant to the next job. For example, when the button "do"

of the staple indicator 32 is pressed while the lock flag is off, the input information is determined to be for the present job and the stapler will be used with the job being processed at present. The job indication administrator 15 outputs once at the proper timing, operational parameters or commands indicating stapling is to be performed to the job process controller 14 in step S25.

Different processing are performed depending on whether step S22B determines that the input is a conditional stop command or to alter an operation parameter. When the conditional stop indicator 33 is turned on, the apparatus has a function of delaying the stopping until the desired condition exists. Consequently, in case that the "designated number of sheets" button is pressed, the operator performs the numeral inputting by use of the ten-key pad 21 and thereby designates that the stop should occur after the inputted number of the sheets have been processed. After the sheets have been processed, the job process controller stops the job in step S25. The fact that the condition has been accomplished is received from the image forming part. For instance, in the case of stopping the copying operation at the tenth sheet of the document, the stoppage indication is performed at the time when the copying operation of the ninth sheet is terminated. As a result, it is not necessary for the operator to perform undesired work; namely to draw out the tenth and other subsequent sheets of the document during the operating period.

As another example, the copying operation can be stopped during a double-sided copy operation after an even numbered page has been copied. This allows a restart operation to easily occur.

As an additional example of a conditional stop, when feeding different page sizes of the document during the series of paper feeding operations, the coping operation is temporarily stopped at the position of the change which allows a convenient operation such as paper feeding from the hand-inserted tray or another tray accommodating the other size recording paper. Furthermore, the stoppage of the copying operation or the changing of a paper discharging tray can be performed when the operator is standing near the paper sorter, making it possible to stack the recording paper in different groups.

When step S22A determines that the input information relates to the present job and step S22B determines that the information pertains to an operation parameter of the present job, for example, relating to the above-described use of the stapling operation which is an operation parameter, the job process controller issues an appropriate command indicating that the input operation parameter is to be used in step 24.

When step S22A determines that the input information relates to the end of the present job, step S23 is performed in which the action which is to be taken at the end of the present job is determined based on the input command and stored in a memory. Subsequently, when the operation is determined to have ended, the stored operation is then performed.

When step S22A determines that the input information relates to the next job, step S26 determines the appropriate action based on the input parameter which is to be taken for the next job and this information is stored. Subsequently, when it is time for the next job to begin, this stored parameter is read from memory and the copying operation is executed based on this parameter.

For example, when the notification by sound button is pressed and is indicated as being for the next job, this command for the next job is stored. When the job process controller 14 determines that the end of the next job has occurred, by an appropriate signal received from the information controller, sound is generated by the sound generator 18.

Turning back to the flowchart illustrated in FIG. 4, when step S1 determines that no information has been input, or the input information processing of step S8 illustrated in detail in FIG. 5 has ended, the job indication controller 15 obtains information regarding the operational state of the image forming parts from the job process controller 14 in step S2. When step S3 determines that the operation of the copier has not ended, step S9 is performed which determines if stop timing exists. For example, a time could have been previously inputted by an operator indicating that an operation is to stop at a certain time. If step S9 determines that information relating to the stop timing exists, step S10 is performed which determines the current time. If there is coincidence between the current time and the time at which the operation is to stop, step S11 determines that there is coincidence and the job is stopped in step S12 by the job process controller. If step S9 determines that the stop timing does not exist or step S11 determines that the current time does not coincide with the stop time previously input, the process ends. However, immediately after ending, the process of FIG. 4 begins again so that if a coincidence of timing in step S11 was determined not to exist, the process of steps S1, S2, S3, S9, S10, and S11 will be performed until the current time reaches the set time.

If step S3 determines that the operation has ended, step S4 determines if information has been input which indicates that a function needs to be performed when the process has ended. If this information is determined to exist by step S4, step S5 is performed by the job controller such that the appropriate processing corresponding to the indication is performed since the copy operation has ended.

Next, step S6 determines whether there is an indication of a next job in the queue. If there is, commands to begin performing the next job are issued by the system controller in step S7. Alternatively, if step S6 determines that a next job does not exist, the process ends.

As the process of FIG. 4 is continuously performed, once the job is stopped in step 12, if an indication of another job exists, steps S1, S2, S3, S4, and S6 will be immediately performed so that the next job can be performed. As an example, if a command is input which indicates that sound is to be generated at the end of a job, step S4 would determine that an indication exists to perform a function at the end of the operation and step S5 would be performed and the job process controller would indicate that the sound is to be generated. As another example, if the next job is to place the copier in a pre-heating state, step S7 would be performed which transfer the state of the image forming apparatus to an energy saving state.

According to the present invention, the parameters and information describing the next job which is to be formed can be entered when the copy machine is operating on a current job and accordingly, the operator does not have to wait until the current job is terminated before entering the necessary information.

Further, the present invention allows the copier machine to be placed into an energy saving mode by having the next job place the copier in the energy saving mode. Accordingly, the operator does not have to wait until the job finishes and can leave the office. As soon as the copying job has finished, the copier can be turned off without waiting for a conventional timer to place the copier in an energy saving mode.

Further, the present invention allows a sound to be generated which notifies a waiting operator that the copying job has finished. Accordingly, the operator does not have to continuously look to see if the copying operation is complete but will be notified by sound when the copying job is complete.

Further, since the present invention allows inputting of commands and parameter manipulation when a series of copying operations are being performed, it is possible to change the operating parameters either partially or entirely during a copy operation. For example, various types of modes such as changing the copy paper which is being used or altering the magnification or reduction amount can be performed as the copier is operating.

Further, the present invention allows inputting, while a copy operation is occurring, information indicating that a copy operation is to be terminated when a predetermined condition exists. For example, when the copy operation performs a certain number of copies which corresponds to a number input by a user, the copy operation can be automatically terminated.

Additionally, it is possible to use the lock button to prevent erroneous input from being entered into the copier. When the user interface is desired to be used, the keyboard is simply unlocked by pressing the appropriate button so that information can again be input into the copier.

The present invention uses one or more microcomputers or control boards to perform the above-described functions. These microcomputers or control boards may be implemented using conventional microprocessors or a conventional general purpose digital computer programmed according to the teachings of the present application, as will be appropriate to those skilled in the art. Appropriate software coding can readily be prepared by skilled programmers based on the teachings of the present disclosure, as will be apparent to those skilled in the software art. The invention may also be implemented by the preparation of applications specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image forming apparatus, comprising:
   a user interface which inputs information from a user including information regarding a certain time when to stop generating images and outputs information to the user;
   an automatic document feeder;
   an optical scanner which receives pages from the automatic document feeder;
   an image generator which prints an image using image information received from the optical scanner; and
   a controller, connected to the user interface, automatic document feeder, optical scanner, and image generator which receives, when the image forming apparatus is generating images input information from the user interface and changes parameters used to control the image forming apparatus,
   wherein the controller changes parameters of a currently executing job;
   wherein the controller changes parameters of a job which is to execute in the future; and
   wherein the controller stops the generation of images when the certain time to stop the generation of images has occurred.

2. An image forming apparatus according to claim 1, wherein:
   the user interface further inputs information including information regarding additional processing to be performed; and
   the controller performs the additional processing after a current job finishes.

3. An image forming apparatus comprising:
   a user interface which inputs information from a user and outputs information to the user;
   an automatic document feeder;
   an optical scanner which receives pages from the automatic document feeder;
   an image generator which prints an image using image information received form the optical scanner; and
   a controller, connected to the user interface, automatic document feeder, optical scanner, and image generator which receives, when the image forming apparatus is generating images input information from the user interface and changes parameters used to control the image forming apparatus,
   wherein the user interface comprises a lock key which locks other input devices of the user interface.

4. An image forming apparatus comprising:
   a user interface which inputs information from a user and outputs information to the user;
   an automatic document feeder;
   an optical scanner which receives pages from the automatic document feeder;
   an image generator which prints an image using image information received form the optical scanner; and
   a controller, connected to the user interface, automatic document feeder, optical scanner, and image generator which receives, when the image forming apparatus is generating images input information from the user interface and changes parameters used to control the image forming apparatus,
   wherein the user interface further inputs information regarding additional processing, which includes a command to generate a sound after the current job finishes.

5. An image forming comprising:
   a user interface which inputs information from a user and outputs information to the user;
   an automatic document feeder;
   an optical scanner which receives pages from the automatic document feeder;
   an image generator which prints an image using image information received form the optical scanner; and
   a controller, connected to the user interface, automatic document feeder, optical scanner, and image generator which receives, when the image forming apparatus is generating images input information from the user interface and changes parameters used to control the image forming apparatus,
   wherein the user interface further inputs information regarding additional processing which includes a command to enter an energy saving mode after the current job finishes.

6. An image forming apparatus, comprising:
   a user interface which inputs information from a user and outputs information to the user;
   an automatic document feeder;
   an optical scanner which receives pages from the automatic document feeder;

an image generator which prints an image using image information received form the optical scanner; and a controller, connected to the user interface, automatic document feeder, optical scanner, and image generator which receives, when the image forming apparatus is generating images, the input information from the user interface and sets a condition which upon occurring stops the generation of images.

7. An image forming apparatus according to claim 6, wherein:

the user interface inputs when the image forming apparatus is generating images, a number of sheets; and the controller stops the generation of images after the number of sheets has been generated.

8. An image forming apparatus according to claim 6, wherein:

the user interface inputs when the image forming apparatus is generating images, an indication to stop after an even numbered page; and the controller stops the generation of images which are double sided, after an even numbered image has been generated and restarts the generation of images thereafter.

9. An image forming apparatus according to claim 6, wherein:

the user interface inputs when the image forming apparatus is generating images, an indication to stop when feeding different size pages; and the controller stops the generation of images after a different size page is encountered and restarts the generation of images thereafter.

10. An image forming apparatus according to claim 6, wherein the user interface comprises:

a lock key which locks use of other input devices of the user interface.

11. A method of forming images, comprising the steps of:

receiving information regarding a certain time when to stop generating images;

generating a plurality of images;

inputting, when the plurality of images are being generated, information changing parameters used to control the generation of images;

changing the parameters used to control the image forming process as the image forming process is occurring; and stopping the generation of images when the certain time occurs, wherein the inputting step inputs information relating to a change of parameters of a currently executing job; and wherein the inputting step inputs information relating to a change of parameters of a job which is to execute in the future.

12. A method of forming images, comprising the steps of:

generating a series of images;

inputting, when the images are being generated, information which indicates a condition which upon occurring stops the generation of images;

determining that the condition exists; and stopping the generating of images when the condition has been determined to exist.

\* \* \* \* \*